(12) United States Patent
Al-Hamouz et al.

(10) Patent No.: US 9,384,560 B2
(45) Date of Patent: Jul. 5, 2016

(54) CONTAMINATION LEVEL ESTIMATION METHOD FOR HIGH VOLTAGE INSULATORS

(71) Applicant: KING FAHD UNIVERSITY PETROLEUM AND MINERALS, Dhahran (SA)

(72) Inventors: Zakariya Mahmoud Al-Hamouz, Dhahran (SA); Luqman Sulyman Maraaba, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 92 days.

(21) Appl. No.: 14/525,211

(22) Filed: Oct. 27, 2014

(65) Prior Publication Data

US 2016/0117845 A1    Apr. 28, 2016

(51) Int. Cl.
G06K 9/62    (2006.01)
G06T 7/40    (2006.01)

(52) U.S. Cl.
CPC ....... *G06T 7/408* (2013.01); *G06T 2207/10024* (2013.01); *G06T 2207/20084* (2013.01)

(58) Field of Classification Search
None
See application file for complete search history.

(56) References Cited

U.S. PATENT DOCUMENTS

| 7,295,687 | B2* | 11/2007 | Kee | G06K 9/00281 340/5.53 |
| 7,797,781 | B2* | 9/2010 | Park | B08B 1/04 15/21.1 |
| 8,400,504 | B2 | 3/2013 | Al-Duwaish et al. | |
| 8,692,537 | B2* | 4/2014 | Hyde | H02J 3/16 307/147 |
| 2009/0109021 | A1* | 4/2009 | Paoletti | G01R 31/343 340/540 |
| 2011/0242313 | A1* | 10/2011 | Al-Duwaish | H04N 7/183 348/126 |
| 2012/0189189 | A1* | 7/2012 | Doe | G06K 9/2018 382/149 |
| 2015/0339570 | A1* | 11/2015 | Scheffler | G06N 3/04 706/16 |

* cited by examiner

*Primary Examiner* — Chan Park
*Assistant Examiner* — Iman K Kholdebarin
(74) *Attorney, Agent, or Firm* — Richard C. Litman

(57) ABSTRACT

The contamination level estimation method for high voltage insulators collects samples of naturally contaminated insulators and builds an image data set for the collected insulators. Flashover voltages of several insulators samples are measured. ESDD levels of the collected insulators are estimated. Images are input to image processing algorithms to extract representative features. The images are segmented. Transforming the image from RGB color space into grayscale model excludes the background from the image. Subsequently, the segmented images are transferred back to RGB color space model using matrix manipulation. Since contaminants on the insulator surface affect the color of the insulator, the segmented image is transformed from RGB to HSV color space which is used for extracting statistical and linear algebraic features from the hue image. A trained artificial neural network correlates the extracted features to the contamination levels enabling testing of other contaminated insulators.

10 Claims, 7 Drawing Sheets

— 700

— 724

— 706

— 708

— 710

— 712

CONTAMINATION LEVEL ESTIMATION METHOD FOR HIGH VOLTAGE INSULATORS

BACKGROUND OF THE INVENTION

1. Field of the Invention

The present invention relates to image processing, and particularly to a contamination level estimation method for high voltage insulators that uses image processing to extract high voltage insulator features, and a neural network to correlate the insulator captured image and contamination levels.

2. Description of the Related Art

Insulator surface contamination and subsequent flow of leakage current have caused operating problems for electric power utilities since electrical power has been in use. The economic impact of failure (flashover) of a single insulator in-service can be very high. Therefore, mitigating measures have to be adopted in order to improve the performance of the power transmission and substation system. Among these mitigating measures is insulator coating; the process of adding hydrophobic materials (Room temperature vulcanized silicon rubber (RTV) and silicone grease) on insulator surface. Such materials prevent the formation of a conducting layer. Therefore, they decrease the magnitude of the leakage current as well as the chance of flashover. Selection of the optimum time for replacing coating materials is still a topic for research. Moreover, coating is difficult to apply and it also difficult to replace and remove the coating material when its life time is exceeded.

A second measure for improving insulator performance is the use of creepage extenders which are achieved by changing the shape of insulator to increase the creepage distance. Therefore, flashover voltage will be increased, and leakage currents will be reduced. However, this method is costly and it is adopted when other methods are not sufficient. The third and most common suppressing measure, where power system utilities spend huge amount of money and time, is regular washing of insulators. It is a demonstrated fact that insulator washing is a very effective but very expensive. In the Saudi Electricity Company (SEC), the annual cost of washing transmission line insulators is about 15 million Saudi riyals, not counting the substation insulator wash cost. However, the major obstacle of using the washing technique is selection of the optimal time of insulator washing which depends on the contamination level.

Insulator contamination is normally measured in terms of equivalent salt deposit density (ESDD) expressed in mg of salt (NaCl) per sq. cm. of insulator surface area. Monitoring of contamination level for high voltage insulators will provide essential information for maintenance departments in the electric utility companies to properly schedule the high-pressure water live line and substation insulator washing. This will result in huge savings in maintenance costs, improvements in the electrical system reliability and facilitation of the prevention of catastrophic flashovers.

Different methods have been developed to monitor and assess the surface contamination level such as Leakage current (LC), Acoustic emission, Thermovision, Ultraviolet (UV) and Digital image processing methods. In leakage current (LC) methods, the magnitude of leakage current is an indicator that gives good information about the pollution severity. However, under conditions where the relative humidity was less than 90%, it appears that the LC would not be a good indicator. Furthermore, LC measurement can be significantly affected by the presence of other electromagnetic waves in the site. Also, installing LC apparatus required certain arrangement and reconstructing of insulator. Acoustic emission is based on the fact that precipitation of contaminants on insulators surface cause's partial discharges. The severity of PD activity increases as the level of contamination increases. PD generates acoustic noise; this noise can be acquired and correlated to the contamination level in order to predict the pollution severity. However, this method can be influenced by the background noise. Thermovision method is based on the fact that the flow of LC on insulator surface generates heat. Temperature distribution (TD) on insulator surface depends on the density of LC. Therefore, TD can help in monitoring of insulator contamination level. Hence, infrared camera can be used to capture thermovision image to detect the TD. However, sun, humidity, wind and temperature can affect the performance of this method. Before the occurrence of complete flashover, a long duration of pre-discharge occurs on the polluted insulator surface. PD generates electromagnetic waves, sound, heat and light. Therefore, using Ultraviolet (UV) method, UV signals (which have wavelength between 240-280 nm) can be detected. However the UV method is significantly affected by environment The use of digital image processing methods has been adopted by two different groups of researchers. Xin et al. and Zhonglin Xia et al. investigated the use of digital cameras in determining the dirty area ratio of insulators using digital image processing. They pointed out that the ratio of the dirty area with respect to the insulator total area may help in determining the contamination severity. Based on the above discussion, it is clear that there exists no tool that can predict contamination level on high voltage insulators using image processing and artificial neural network algorithms.

Thus, a contamination level estimation method for high voltage insulators solving the aforementioned problems is desired.

SUMMARY OF THE INVENTION

The contamination level estimation method for high voltage insulators collects samples of naturally contaminated insulators and builds an image data set for the collected insulators. Flashover voltages of several insulators samples are measured. ESDD levels of the collected insulators are estimated. Images are input to image processing algorithms to extract representative features. The images are segmented. Transforming the image from RGB color space into grayscale model excludes the background from the image. Subsequently, the segmented images are transferred back to RGB color space model using matrix manipulation. Since contaminants on the insulator surface affect the color of the insulator, the segmented image is transformed from RGB to HSV color space which is used for extracting statistical and linear algebraic features from the hue image. A trained artificial neural network correlates the extracted features to the contamination levels enabling testing of other contaminated insulators.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Figure 1:
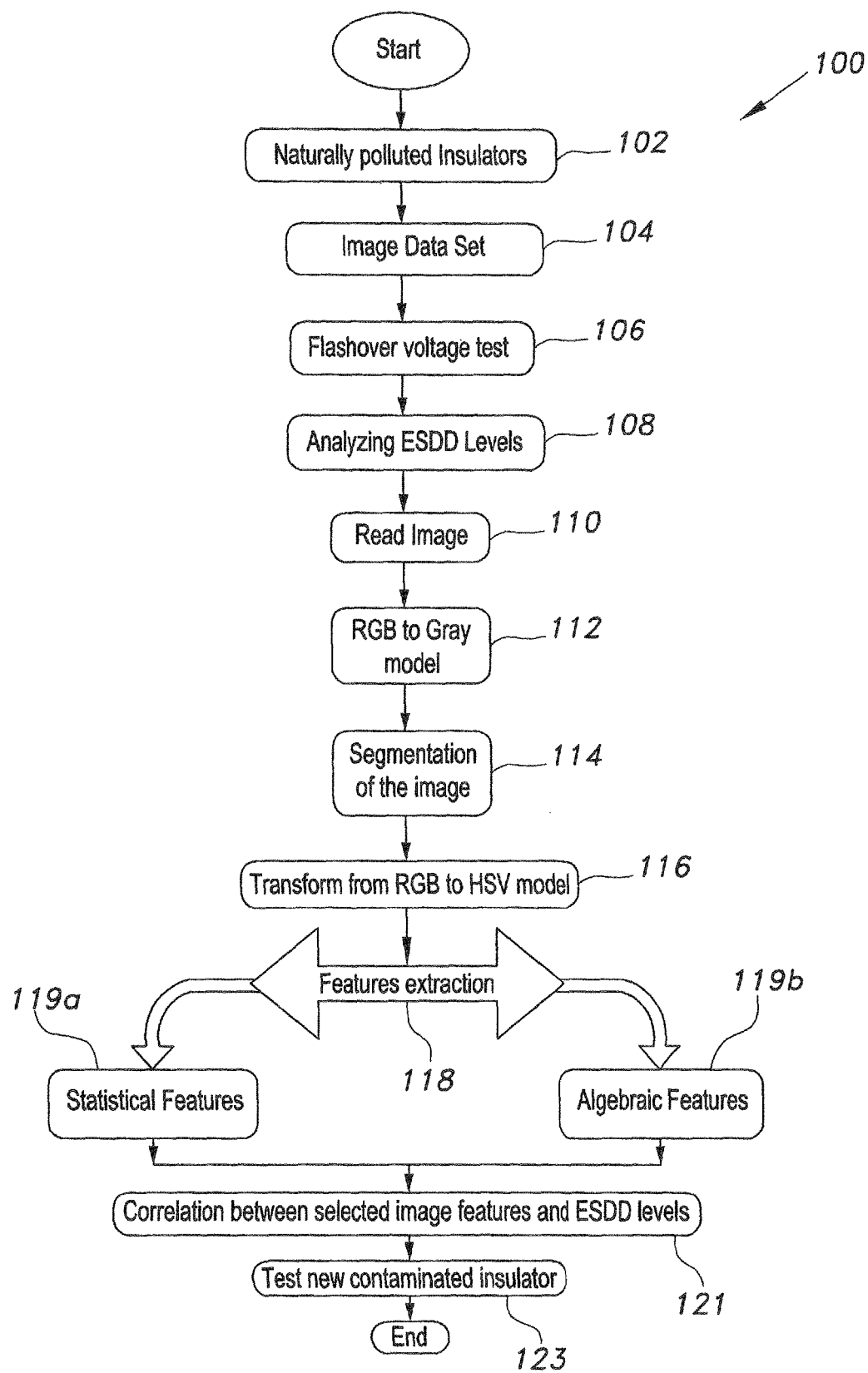
FIG. 1 is a flowchart of the contamination level estimation method according to the present invention.

The contamination level estimation method for high voltage insulators provides a combined image processing technique and artificial neural network that develops the correlation between the insulator selected image features and ESDD levels. FIG. 1 shows the flow chart of the developed contamination estimation method 100. Samples of naturally contaminated insulator are collected at step 102. An image data set is built for the collected insulators at step 104. Flashover voltages of several insulators samples are measured at step 106. ESDD levels of the collected insulators are estimated at step 108. Images are read at step 110. Different image processing algorithms were tried in order to extract representative features from the processed images. For example, at step 112, an RGB to Gray model is formulated.

Step 114 utilizes an edge based segmentation algorithm for image segmentation. Excluding the background from the image was done by transforming the image from RGB (red, green, blue) color space into grayscale model. After that, the segmented images are transferred back to RGB color space model using matrix manipulation. Contaminants on insulator surface affect the color of the insulator. Accordingly, at step 116, an insulator segmented image is transformed from RGB to HSV (hue, saturation, value) color space model. Hue (color) image of insulators is more representative to the contamination on the insulator surface; hence it is used in extracting features. Statistical 119a and linear algebraic 119b features are extracted from the hue image. A trained artificial neural network correlates the extracted features to the contamination levels at step 121. Other contaminated insulators are tested at step 123.

Edge-based segmentation is defined as the process of partitioning an image into non-overlapping meaningful regions (separating the objects and background in an image) based on the edges in an image. Edges are the boundaries between regions in an image which have different attributes (intensity, texture or color). The Sobel operator is used for edge detection. This operator detects the edges by performing a 2D spatial gradient calculation; hence the areas of high gradient values are related to edges. In the Sobel operator, the calculation of the gradient at each point in a grayscale image is done using two convolution masks ($h_x$ and $h_y$) with 3×3 sizes, where these masks are convolved with the grayscale image, one of them approximate the gradient in the x-direction $G_x(x, y)$, and the other approximate the gradient in y-direction $G_y(x,y)$.

$$h_x = \begin{bmatrix} -1 & 0 & 1 \\ -2 & 0 & 2 \\ -1 & 0 & 1 \end{bmatrix}, h_y = \begin{bmatrix} -1 & -2 & -1 \\ 0 & 0 & 0 \\ 1 & 2 & 1 \end{bmatrix} \quad (1)$$

$$G_x(x, y) = h_x * f(x, y), G_y(x, y) = h_y * f(x, y) \quad (2)$$

Accordingly, the gradient component $G_x(x,y)$ and $G_y(x,y)$ are produced separately, these can then be combined together to calculate the absolute magnitude of the gradient and the direction of the gradient at each point. The approximate magnitude and direction (θ) of the gradient calculated as follow:

$$G_x(x,y) = h_x * f(x,y), G_y(x,y) = h_y * f(x,y) \quad (3)$$

where θ is measured with respect to the x-direction.

The HSV (hue, saturation, value) model was fabricated to be more perceptual and intuitive in handling colors, and it is designed to emulate the way humans interpret and perceive colors. The hue is the pure color of light. For example, all green colors have the same hue value even if they are pastel, intense, dark, or light. The saturation is a measure of the color purity; colors which are saturated are pure hue. The value (brightness) of a color is a measure of how dark or light it is. HSV model allows the independent control of hue, saturation, and brightness. In the present method 100, the hue segmented image is used for feature extraction.

Figure 2:
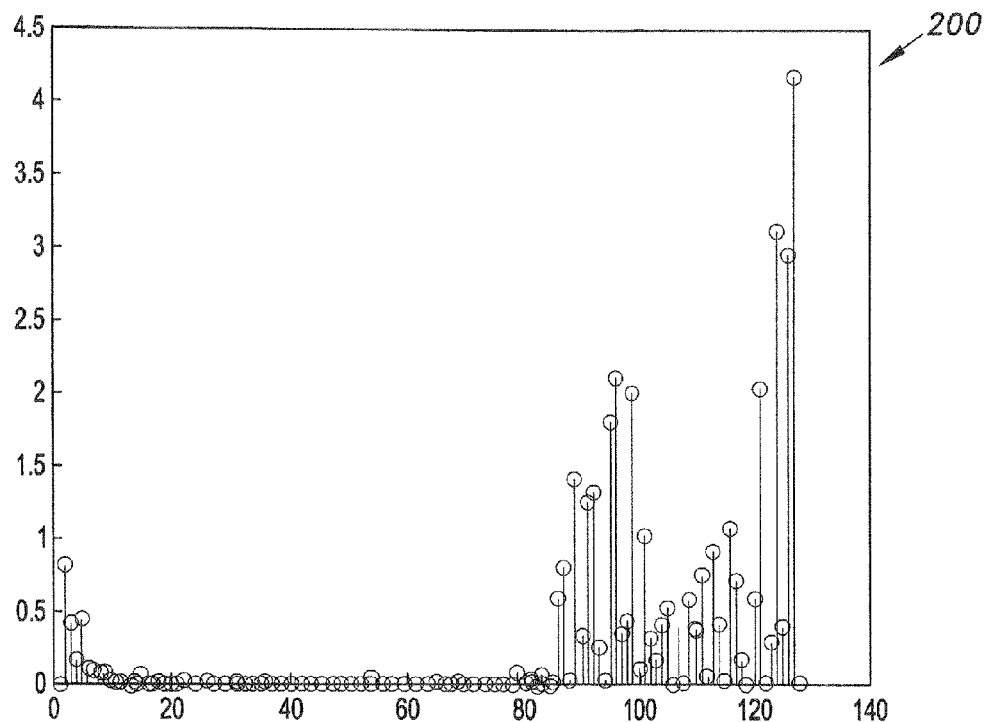
FIG. 2 is an exemplary histogram used in the method according to the present invention.

Image features are of major importance in identification and analysis of regions in an image (image interpretation). They are considered as distinguishing primitive attributes or characteristics of an image. Image features are classified into two types, natural and artificial. Natural feature is the feature which is specified by the visual appearance of the image, while artificial feature is obtained by doing particular modifications and manipulation of an image. Histogram based statistical features and linear algebraic features are examples of artificial features. In this research several types of image histogram based statistical features and linear algebraic features have been extracted from hue insulator segmented image. The histogram of the hue image is a graphical representation of the frequency occurrence of each color (hue value) in the image. Many statistical features, which describe an image or its objects, can be extracted from the hue segmented image histogram such as the mean, variance, skewness, kurtosis, energy and the normalized histogram error, as shown in exemplary plot 200 of FIG. 2. The normalized histogram error between two images (have the same view but one of the images has some noise) provides a good measure about the difference between the two images. The other types of feature that can be extracted from the hue image are the linear algebraic features. In the present contamination level estimation method 100 these features are extracted using the Singular value decomposition (SVD) theorem. The SVD theorem can be applied to an image in order to extract some useful features by factorizing the image into three matrices each one of them has certain properties. Let A be a rectangular matrix, then the SVD of matrix A is $$A = USV^T, \quad (4)$$

where A is a m×n rectangular matrix, U and V are m×m and n×n orthogonal matrices respectively. S is a m×n diagonal matrix, where the entries at the diagonal are called the singular value of A. These singular values arise at the diagonal in descending order $\sigma_1 \geq \sigma_2 \geq \sigma_3 \geq \ldots \geq \sigma_n \geq 0$. The singular values of the matrix A are unique.

Figure 3:
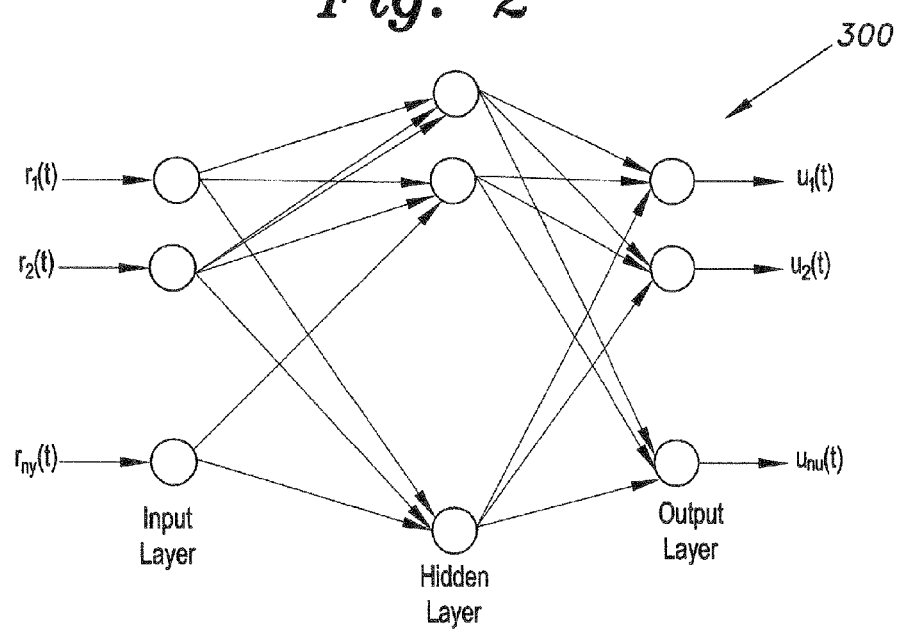
FIG. 3 is a typical MFNN of the kind that could be adapted for performing the contamination level method according to the present invention.

A Multi-layer Feed-forward Neural Network (MFNN) is considered as one of the most important commonly used methods in regression and classification. In general, a MFNN consists of an input layer, several hidden layers, and an output layer. Each layer consists of several numbers of nodes (neuron). Where each node includes a summer and an activation function g. An MFNN network is formed connecting several nodes in parallel and series. A typical MFNN network 300 is shown in FIG. 3. For multi-input multi-output networks such as exemplary network 300, the input vector to the MFNN is given by R (t)=[$r_1$(t) ... $r_n$y(t)]T. Therefore, the input to the $j^{th}$ hidden unit is $$net_j^h(t) = \sum_{i=1}^{ny} w_{ji}^h r_i(t) + \theta_j^h, \quad (5)$$

where $w_{ji}^h$ are the weights of the hidden layer and $\theta_j^h$ is the bias term. The output of the $j^{th}$ hidden neuron is $$g_j(t) = f_j^h(net_j^h(t)) \quad (6)$$

where $f_j^h$ is the activation function. The equations for the output nodes with linear activation functions are $$u_k(t) = \sum_{j=1}^{L} w_{kj}^\circ g_j(t) + \theta_k^\circ \quad (7)$$

where the "°" superscript denotes the output, L is the number of neurons in the hidden layer, $u_k$(t) denotes the $k^{th}$ output unit where k from (1, ..., nu.). The neural network is trained using the back-propagation algorithm, which seeks to find optimum weights biases of the neural network along the negative gradient of a cost function. The cost function is described by $$J = \sum_{i=1}^{n} [u(i) - u_r(i)] \quad (8)$$

where u and $u_r$ denote the actual and desired outputs respectively.

Figure 4:
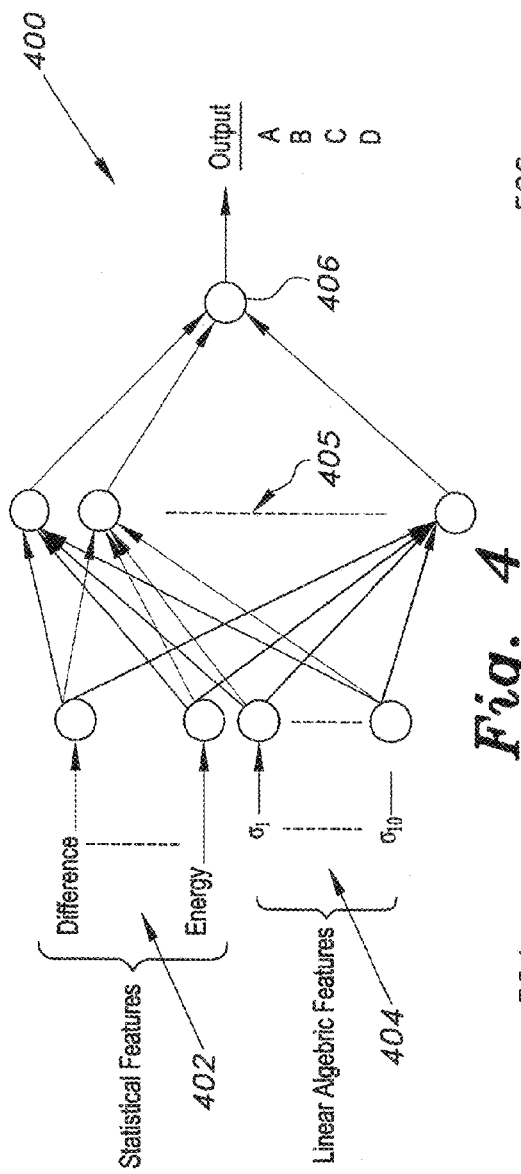
FIG. 4 is a schematic diagram of the MFNN used to perform the contamination level estimation method according to the present invention.

The statistical and linear algebraic features extracted from the processed insulator captured images are used as inputs to the neural network. The feature vector includes seven statistical features and ten linear algebraic features. Therefore, the number of inputs to the developed neural network is seventeen and number of outputs is one (contamination level) as shown in FIG. 4. The training input matrix used looks as follows:

$$\begin{bmatrix} Difference_1 & \ldots & Difference_n \\ Normalized\ error_1 & \ldots & Normalized\ error_n \\ Mean_1 & \ldots & Mean_n \\ Variance_1 & \ldots & Variance_n \\ Skewness_1 & \ldots & Skewness_n \\ Kurtosis_1 & \ldots & Kurtosis_n \\ Energy_1 & \ldots & Energy_n \\ \sigma_{1,1} & \ldots & \sigma_{1,n} \\ \sigma_{2,1} & \ldots & \sigma_{2,n} \\ \sigma_{3,1} & \ldots & \sigma_{3,n} \\ \vdots & \ldots & \vdots \\ \sigma_{9,1} & \ldots & \sigma_{9,n} \\ \sigma_{10,1} & \ldots & \sigma_{10,n} \end{bmatrix}$$

where, n denotes the number of features patterns for training. The developed neural network 400 has three layers (input 403, 404, hidden 405 and output 406) as shown in FIG. 4. The activation functions that have been used in the hidden layer and the output layer are the nonlinear (Tansig) and linear function (Purelin), respectively.

Figure 5:
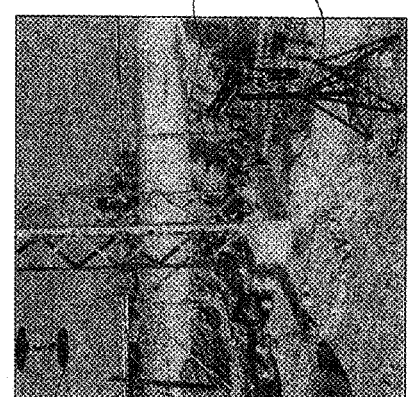
FIG. 5 is an environmental perspective view of equipment used to perform the contamination level estimation method according to the present invention.

Fifty one samples of super fog porcelain insulators were collected (each was designated by a code); eleven samples from SEC and the others are from KFUPM Dhahran Electrical Insulator Research Station. The images of insulators were taken at KFUPM Dhahran Electrical Insulator Research Station; this location was selected because it shares similar environmental conditions (maybe worst conditions) with many transmission lines and substations in the kingdom. Digital camera (Nikon D7000, 16.9 mega pixels) 502 attached to a fixed stand 501 was used to capture images for the collected insulators 504, as shown in environment 500 of FIG. 5.

Figure 8:
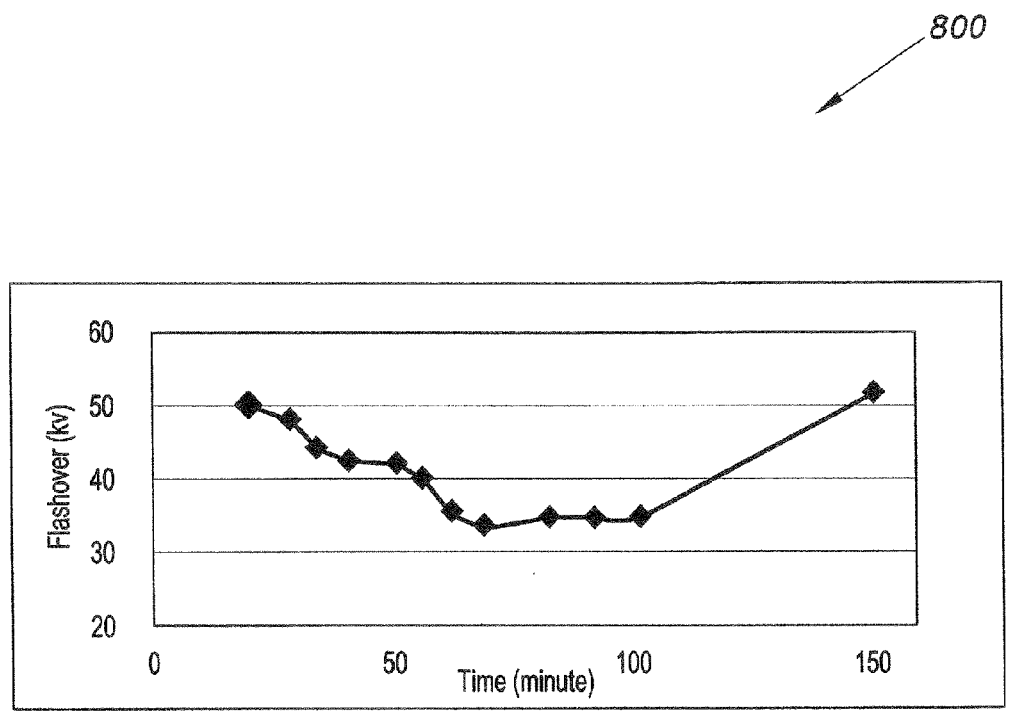
FIG. 8 is a plot showing relations between flashover and time of a 12B type insulator.

In order to study the effect and relation of pollution level and distribution of contamination on insulator flashover voltage (FOV), six representative insulators samples were chosen to be tested (at the high voltage lab of the research institute at KFUPM) to measure the flashover voltage (50% flashover voltage ($U_{50\%}$). Plot 800 of FIG. 8 shows the relation between the flashover (kV) and time (minutes) of insulator number 12B described in Table 1. It can be seen that the flashover voltage ($U_{50\%}$) is the lowest point (minimum flashover voltage) which corresponds to 33.6 kV. The flashover voltages ($U_{50\%}$) for the six tested insulator samples are listed in Table 1.

TABLE 1

Flashover voltage for the tested insulators

| | Insulator code | | | | | |
|---|---|---|---|---|---|---|
| | 12B | 14B | 2D | 6DT | 5AT | 6AE |
| Operating areas | KFUPM station | KFUPM station | Dammam BSP | Dammam BSP | Qatif BSP | Qatif BSP |
| Flashover voltage ($U_{50\%}$) (kV) | 33.6 | 33.8 | 44.5 | 48.5 | 43.3 | 43 |

The International Electro technical Commission (IEC) adopted a standard method to find the ESDD value in case of porcelain insulators. Based on that method, the ESDD levels of the 51 collected insulator samples were estimated at the high voltage laboratory at the RI-KFUPM. Table 2 shows the ESDD values of 36 collected insulators while the other 15 ESDD values are listed in Table 5. As can be seen, the estimated ESDD values ranges from 0.0001 to more than 0.4 mg/cm². Therefore, the levels of contamination were classified into four ranges: light pollution level (ESDD<0.1), medium pollution level (0.1≤ESDD<0.2), heavy pollution level (0.2≤ESDD<0.3) and very heavy pollution level (0.3≤ESDD).

TABLE 2

ESDD values of 36 collected insulators

| Insulator code | ESDD value mg/cm² | Pollution level |
|---|---|---|
| Clean | 0.0009 | Light |
| 1F | 0.0221 | Light |
| 2F | 0.0227 | Light |
| 3F | 0.0219 | Light |
| 5AT | 0.2107 | Heavy |
| 6AE | 0.1701 | Medium |
| 7A | 0.1866 | Medium |
| 1D | 0.2735 | Heavy |
| 2D | 0.2962 | Heavy |
| 3DE | 0.2894 | Heavy |
| 5DE | 0.2738 | Heavy |
| 10BE | 0.4461 | Very Heavy |
| 11BE | 0.4083 | Very Heavy |
| 12B | 0.4134 | Very Heavy |
| 1G | 0.1066 | Medium |
| 3G | 0.0207 | Light |
| 5G | 0.0760 | Light |
| 6G | 0.1659 | Medium |
| 7G | 0.1084 | Medium |
| 8G | 0.0907 | Light |
| 9G | 0.0882 | Light |
| 10G | 0.0357 | Light |
| 2H | 0.1554 | Medium |
| 3H | 0.0314 | Light |
| 4H | 0.1400 | Medium |
| 5H | 0.0730 | Light |
| 6H | 0.0273 | Light |
| C1 | 0.0007 | Light |
| C2 | 0.0007 | Light |
| C4 | 0.0009 | Light |
| C5 | 0.0009 | Light |
| C6 | 0.0008 | Light |
| C8 | 0.0008 | Light |
| C10 | 0.0009 | Light |
| C11 | 0.0007 | Light |
| C12 | 0.0009 | Light |

Figure 6:
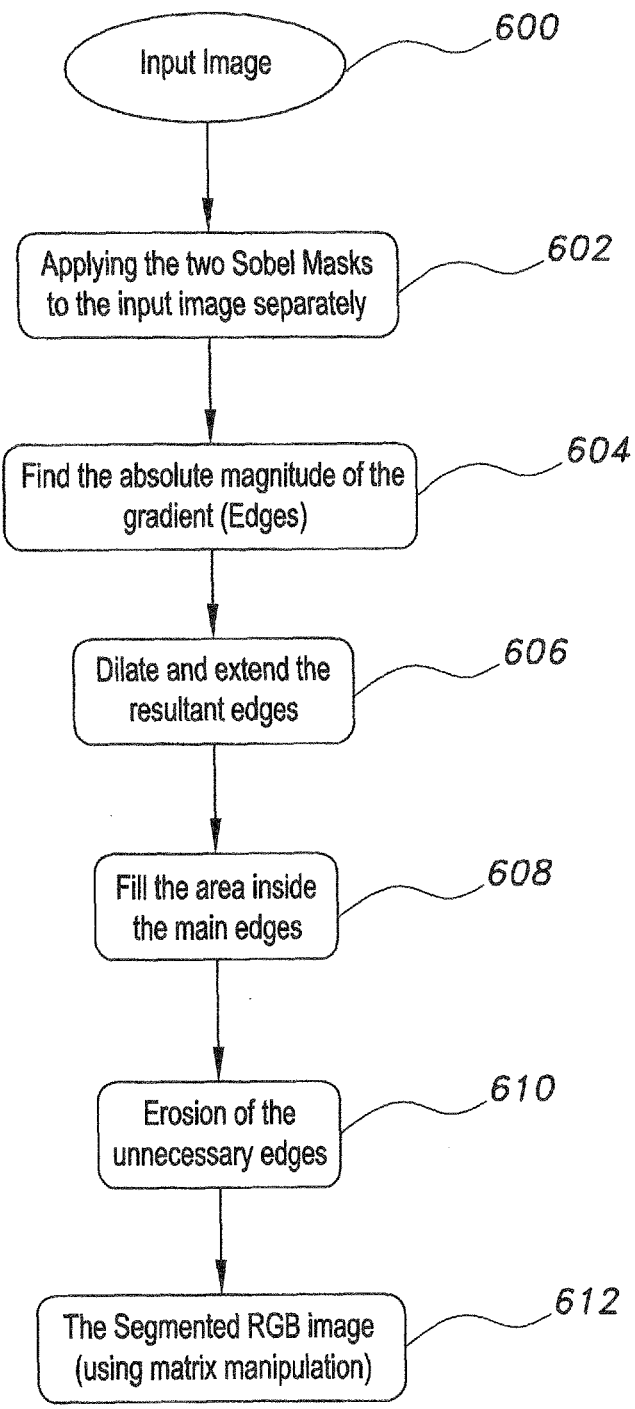
FIG. 6 is a flowchart of the stage two segmentation procedure used in the contamination level estimation method according to the present invention.
Figure 7A:
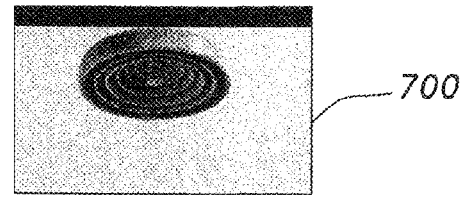
FIG. 7A is the input image applied to the stage two segmentation procedure according to the present invention.
Figure 7B:
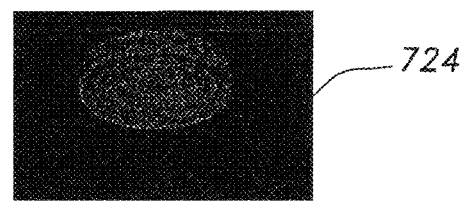
FIG. 7B is the image resulting from Sobel mask application and edge detection according to the present invention.
Figure 7C:
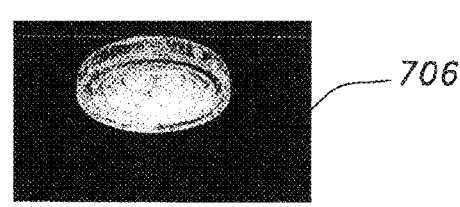
FIG. 7C is the image resulting from dilation and edge extension according to the present invention.
Figure 7D:
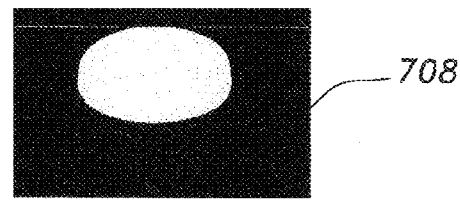
FIG. 7D is the image resulting from the image fill step according to the present invention.
Figure 7E:
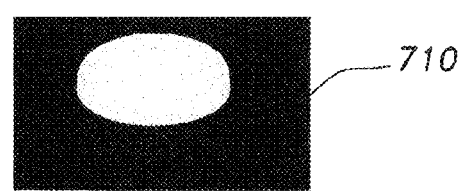
FIG. 7E is the image resulting from the 'unnecessary edge' erosion step according to the present invention.
Figure 7F:
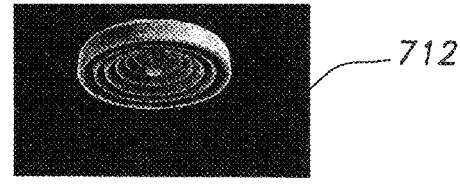
FIG. 7F is the image resulting from the RGB image segmentation step according to the present invention.
Figure 9A:
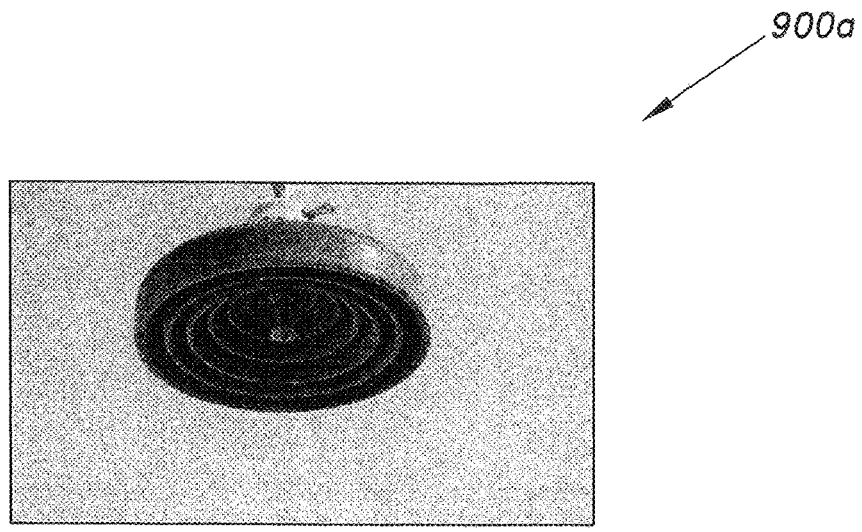
FIG. 9A is an original grayscale image used by the contaminant estimation procedure according to the present invention.
Figure 9B:
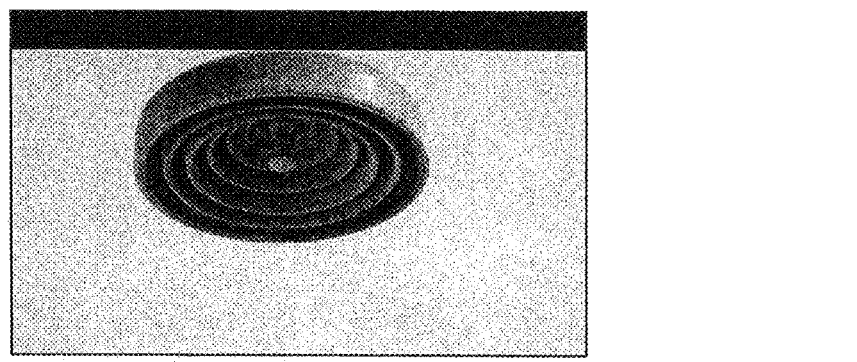
FIG. 9B is the first stage segmented image produced by the contaminant estimation procedure according to the present invention.

Segmentation of insulator image has been done in two stages using Matlab software. In the two stages, segmentation has been done for a grayscale insulator image 900a as shown in FIG. 9A. In the first stage, as shown in image 900b of FIG. 9B, the cap of insulator has been excluded from the image using matrix manipulation, where all of the pixels values above the edge between the cap and insulators have been changed to zero. The position of that edge is fixed for all insulators images. In the second stage of segmentation, an edge based segmentation method was used. The flowchart in FIG. 6 shows the steps of segmentation in stage two. The result of each step, in addition to the final RGB segmented image is shown in FIGS. 7A through 7F. In this segmentation method, the image 700 is input at step 600. The Sobel masks are applied at step 602 and together with step 604 in which edge discovery is performed using absolute magnitude of the gradient, the resulting image 724 is produced. Dilation and extension of the resultant edges is performed at step 606 resulting in image 706. Step 608 fills the area inside the main edges, resulting in image 708. At step 610 unnecessary edges are eroded, resulting in image 710. At step 612 matrix manipulation produces a segmented RGB image 712.

Two groups of features were extracted from each hue segmented insulator image in order to represent the level of contamination on insulator surface. One of the groups was histogram based statistical features while the other was SVD theorem based linear algebraic features. Based on the histogram of the hue image, statistical features such as mean, variance, skewness, kurtosis, energy, normalized histogram error and the percentage difference between the hue histograms of clean reference image and the collected ones were extracted. Using the SVD theorem, the first 10 singular values $\sigma_1, \sigma_2, \sigma_3, \ldots, \sigma_{10}$ are taken to be the linear algebraic features. Table 3 shows the statistical feature values and linear algebraic features of different insulator samples as well as its corresponding ESDD values.

TABLE 3

Samples of statistical and linear algebraic features and its corresponding ESDD values of different insulators

| Image code | C13 | 7A | 10BE |
|---|---|---|---|
| Difference | 7.9534 | 27.1491 | 59.7362 |
| Normalized error | 0.2284 | 2.0792 | 10.0607 |
| Mean | 19.116 | 22.3834 | 23.7964 |
| Variance | 896.83 | 701.83 | 312.24 |
| Skewness | 6.7184 | 5.9281 | 9.1282 |
| Kurtosis | 47.672 | 40.0282 | 95.4254 |
| Energy | 0.0997 | 0.0643 | 0.0947 |
| ESDD | 0.000 | 0.18662 | 0.44609 |
| $\sigma_1$ | 72.0788 | 84.1564 | 78.8486 |
| $\sigma_2$ | 41.68 | 41.8924 | 26.2712 |
| $\sigma_3$ | 33.8722 | 34.1485 | 18.9179 |
| $\sigma_4$ | 28.1094 | 22.7163 | 17.8801 |
| $\sigma_5$ | 25.6998 | 20.5059 | 16.7864 |
| $\sigma_6$ | 21.3522 | 15.6106 | 15.7582 |
| $\sigma_7$ | 18.7574 | 13.9311 | 15.0034 |
| $\sigma_8$ | 17.8218 | 12.5835 | 12.3665 |
| $\sigma_9$ | 16.4155 | 12.0963 | 11.6545 |
| $\sigma_{10}$ | 15.263 | 11.6151 | 11.0019 |
| ESDD | 0.00092 | 0.1866296 | 0.4460936 |

To train and test the neural network, the collected insulators have been divided into a training group and a testing one. Thirty six insulators with their feature patterns and ESDD levels are used for training the developed neural network. The other fifteen insulator samples with their features and ESDD values are used for testing the developed neural network. The insulators groups with their code numbers and corresponding ESDD levels, selected for training and testing the networks, are given in Tables 2 and 5, respectively. The outputs of the developed neural network are assigned letters as in Table 4. The training of the neural network is accomplished using the most commonly used training algorithm (gradient back-propagation).

TABLE 4

Outputs of the Neural Network

| Pollution Level | ESDD Range | Output |
|---|---|---|
| Light level | ESDD < 0.1 | A |
| Medium | (0.1 ≤ ESDD < 0.2) | B |
| Heavy | (0.2 ≤ ESDD < 0.3) | C |
| Very heavy | (0.3 ≤ ESDD) | D |

Different numbers of hidden units have been tried such that the performance of the network was optimized. The number of hidden neurons in the optimized neural network was eleven, where the mean square error (MSE) for training and testing was the minimum (MSE=0.0001) and (MSE=0.0017), respectively. The validation results of using the testing data given in Table 5 (for fifteen insulators) indicated that the developed neural network was able to predict correctly the level of contamination for thirteen insulators, while for the other two insulators the pollution level was wrongly estimated. Accordingly, the performance of the developed network is 86.67%. It can be seen that the maximum error of testing for the developed neural network is 0.0989 as shown in Table 5, therefore the error in the number of category levels between the predicted and actual ESDD levels was one (for example the predicted level of pollution is B while the actual level is C).

In the present invention, a method for estimating the contamination level of high voltage insulators without the intervention of humans has been developed. The developed contamination level estimation method is based on a combination of image processing technique and artificial neural networks. Levels of contamination are classified into four categories: light pollution level, medium pollution level, heavy pollution level and very heavy pollution level. Segmentation of insulator image has been done in two stages using Matlab software. In the first stage, the cap of the insulator has been excluded from the image using matrix manipulation. In the second stage, an edge based segmentation method was used to exclude the background. Image processing has been used to extract needed features from insulators' hue segmented images to assess the contamination level that would lead to a flashover. Two types of image features were considered. The first is a histogram based statistical feature. The second feature is a SVD theorem based linear algebraic feature. A Multi-layer Feed-forward Neural Network (MFNN) was used to design a neural network which is capable of predicting the level of contamination (ESDD level) of polluted insulators. The input to the network is the extracted features of insulators images and the output is the pollution levels. The rate of success of the developed tool is 86.67%. It is expected that the developed method, if well implemented, will prevent catastrophic flashovers and reduces forced outage time by giving accurate information about the contamination level in advance, hence improving the overall reliability of the electrical system.

TABLE 5

Validation Result

| Insulator code | Measured ESDD value mg/cm$^2$ | Actual Pollution level | Predicted ESDD value mg/cm$^2$ | Predicted Pollution level | Absolute Error |
| --- | --- | --- | --- | --- | --- |
| 4F | 0.0234 | A | 0.0128 | A | 0.0106 |
| 8A | 0.2003 | C | 0.1233 | B | 0.077 |
| C13 | 0.0009 | A | 0.0011 | A | 0.0002 |
| 9AE | 0.1817 | B | 0.2806 | C | 0.0989 |
| 4D | 0.2765 | C | 0.2932 | C | 0.0167 |
| 6DT | 0.3024 | D | 0.3028 | D | 0.0004 |
| 13BT | 0.4468 | D | 0.3653 | D | 0.0815 |
| 14B | 0.4162 | D | 0.4032 | D | 0.013 |
| 2G | 0.1863 | B | 0.1911 | B | 0.0048 |
| 4G | 0.0217 | A | 0.0257 | A | 0.004 |
| 1H | 0.0279 | A | 0.0506 | A | 0.0227 |
| 7H | 0.0789 | A | 0.0438 | A | 0.0351 |
| C3 | 0.0007 | A | 0.0006 | A | 0.0053 |
| C7 | 0.0007 | A | 0.0062 | A | 0.0055 |
| C9 | 0.0010 | A | 0.0119 | A | 0.0109 |

It is to be understood that the present invention is not limited to the embodiments described above, but encompasses any and all embodiments within the scope of the following claims.

We claim:

1. A contamination level estimation method for high voltage insulators, comprising the steps of:
    building an image data set of a collection of naturally polluted insulator samples;
    estimating equivalent salt deposit density (ESDD) levels of the collection, the ESDD estimations being used for training a Multi-layer Feed-forward Neural Network (MFNN);
    forming a grayscale model from an RGB representation of each of the images;
    a first stage segmentation step comprised of segmenting the grayscale insulator images to exclude an insulator cap from the image using matrix manipulation;
    a second stage edge based segmentation step comprised of segmenting the grayscale insulator images to exclude the background;
    transforming the RGB representation of each of the images to an HSV representation of each of the images;
    extracting statistical and algebraic features from the HSV representation of each of the images, wherein the HSV segmented images are used to assess the contamination level that would lead to a flashover;
    using the statistical and algebraic features and the ESDD estimates to train the (MFNN) to correlate levels of contamination captured in insulator images with ESDD levels, the contamination levels being light pollution level, medium pollution level, heavy pollution level and very heavy pollution level categories;
    classifying live insulator images using the MFNN; and
    outputting to a user the classified high voltage insulator pollution levels as a corollary to equivalent salt deposit density (ESDD).

2. The contamination level estimation method for high voltage insulators according to claim 1, wherein the second stage edge based segmentation step further comprises the steps of:
    separately applying first and second Sobel masks to the input images, the first Sobel mask being characterized by the relation, $$h_x = \begin{bmatrix} -1 & 0 & 1 \\ -2 & 0 & 2 \\ -1 & 0 & 1 \end{bmatrix},$$

the second Sobel mask being characterized by the relation, $$h_y = \begin{bmatrix} -1 & -2 & -1 \\ 0 & 0 & 0 \\ 1 & 2 & 1 \end{bmatrix};$$

finding an absolute magnitude of a gradient of the images to determine edges of the images, the absolute magnitude of the gradient being characterized by the relations, $$G_x(x,y)=h_x*f(x,y), G_y(x,y)=h_y*f(x,y);$$

dilating and extending the edges;
filling an area defined by the edges; and
eroding unnecessary edges.

3. The contamination level estimation method for high voltage insulators according to claim 1, wherein the algebraic feature extraction further comprises the step of factoring the images into three matrices characterized by the relation, $$A = USV^T,$$

where A is a m×n rectangular matrix, U and V are m×m and n×n orthogonal matrices and S is a m×n diagonal atm, where the entries at the diagonal are singular values of A arising at the diagonal in descending order $\sigma_1 \geq \sigma_2 \geq \sigma_3 \geq \ldots \geq \sigma_n \geq 0$.

4. The contamination level estimation method for high voltage insulators according to claim 1, wherein the MFNN training step further comprises the step of using a back-propagation algorithm to find optimum weight biases of the MFNN along a negative gradient of a cost function, the cost function being characterized by the relation, $$J = \sum_{i=1}^{n} [u(i) - u_r(i)],$$

where u and $u_r$ denote actual and desired outputs respectively.

5. The contamination level estimation method for high voltage insulators according to claim 1, wherein the ESDD/level correlations are characterized by the relations, light pollution level=(ESDD<0.1), medium pollution level=(0.1≤ESDD<0.2), heavy pollution level=(0.2≤ESDD<0.3), and very heavy pollution level=(0.3≤ESDD).

6. A computer software product, comprising a non-transitory medium readable by a processor, the non-transitory medium having stored thereon a set of instructions for performing a contamination level estimation method for high voltage insulators, the set of instructions including:
   (a) a first sequence of instructions which, when executed by the processor, causes said processor to build an image data set of a collection of naturally polluted insulator samples;
   (b) a second sequence of instructions which, when executed by the processor, causes said processor to estimate equivalent salt deposit density (ESDD) levels of the collection, the ESDD estimations being used for training a Multi-layer Feed-forward Neural Network (MFNN);
   (c) a third sequence of instructions which, when executed by the processor, causes said processor to form a grayscale model from an RGB representation of each of the images;
   (d) a fourth sequence of instructions which, when executed by the processor, causes said processor to perform a first stage segmentation step comprised of segmenting the grayscale insulator images to exclude an insulator cap from the image using matrix manipulation;
   (e) a fifth sequence of instructions which, when executed by the processor, causes said processor to perform a second stage edge based segmentation step comprised of segmenting the grayscale insulator images to exclude the background;
   (f) a sixth sequence of instructions which, when executed by the processor, causes said processor to transform the RGB representation of each of the images to an HSV representation of each of the images;
   (g) a seventh sequence of instructions which, when executed by the processor, causes said processor to extract statistical and algebraic features from the HSV representation of each of the images, wherein the HSV segmented images are used to assess the contamination level that would lead to a flashover;
   (h) an eighth sequence of instructions which, when executed by the processor, causes said processor to use the statistical and algebraic features and ESDD estimates to train the (MFNN) to correlate levels of contamination captured in insulator images with ESDD levels, the contamination levels being light pollution level, medium pollution level, heavy pollution level and very heavy pollution level categories;
   (i) a ninth sequence of instructions which, when executed by the processor, causes said processor to classify live insulator images using the MFNN; and
   (j) a tenth sequence of instructions which, when executed by the processor, causes said processor to output to a user the classified high voltage insulator pollution levels as a corollary to equivalent salt deposit density (ESDD).

7. The computer software product according to claim 6, further comprising:
   eleventh sequence of instructions which, when executed by the processor, causes said processor to separately apply first and second Sobel masks to the input images, the first Sobel mask being characterized by the relation, $$h_x = \begin{bmatrix} -1 & 0 & 1 \\ -2 & 0 & 2 \\ -1 & 0 & 1 \end{bmatrix},$$

the second Sobel mask being characterized by the relation, $$h_y = \begin{bmatrix} -1 & -2 & -1 \\ 0 & 0 & 0 \\ 1 & 2 & 1 \end{bmatrix};$$

twelfth sequence of instructions which, when executed by the processor, causes said processor to find an absolute magnitude of a gradient of the images to determine edges of the images, the absolute magnitude of the gradient being characterized by the relations, $G_x(x,y)=h_x*f(x,y), G_y(x,y)=h_y*f(x,y);$ thirteenth sequence of instructions which, when executed by the processor, causes said processor to dilate and extend the edges;
   fourteenth sequence of instructions which, when executed by the processor, causes said processor to fill an area defined by the edges; and
   fifteenth sequence of instructions which, when executed by the processor, causes said processor to erode unnecessary edges.

8. The computer software product according to claim 6, further comprising:
   sixteenth sequence of instructions which, when executed by the processor, causes said processor to factor the images into three matrices characterized by the relation, $$A = USV^T,$$

where A is a m×n rectangular matrix, U and V are m×m and n×n orthogonal matrices and S is a m×n diagonal matrix, where the entries at the diagonal are singular values of A arising at the diagonal in descending order $\sigma_1 \geq \sigma_2 \geq \sigma_3 \geq \ldots \geq \sigma_n \geq 0$.

9. The computer software product according to claim 6, further comprising:

seventeenth sequence of instructions which, when executed by the processor, causes said processor to use a back-propagation algorithm to find optimum eight biases of the MFNN along a negative gradient of a cost function, the cost function being characterized by the relation, $$J = \sum_{i=1}^{n} [u(i) - u_r(i)],$$

where u and $u_r$ denote actual and desired outputs respectively.

10. The computer software product according to claim 6, further comprising:

eighteenth sequence of instructions which, when executed by the processor, causes said processor to establish ESDD/level correlations characterized by the relations, light pollution level=(ESDD<0.1), medium pollution level=(0.1≤ESDD<0.2), heavy pollution level=(0.2≤ESDD<0.3), and very heavy pollution level=(0.3≤ESDD).

* * * * *